(12) United States Patent
Khor

(10) Patent No.: US 7,059,779 B2
(45) Date of Patent: Jun. 13, 2006

(54) OPTICAL FIBER RECEPTACLE ADAPTOR

(76) Inventor: Albert Wooi Quan Khor, Blk 701, #14-14, Jurong West St. 71, Singapore 640701 (SG)

( * ) Notice: Subject to any disclaimer, the term of this patent is extended or adjusted under 35 U.S.C. 154(b) by 0 days.

(21) Appl. No.: 10/782,148

(22) Filed: Feb. 19, 2004

(65) Prior Publication Data
US 2005/0185894 A1   Aug. 25, 2005

(51) Int. Cl.
*G02B 6/38* (2006.01)
*G02B 6/36* (2006.01)

(52) U.S. Cl. .............................. 385/65; 385/75; 385/92
(58) Field of Classification Search ................ 385/92, 385/60, 65, 72, 75, 78, 89
See application file for complete search history.

(56) References Cited

U.S. PATENT DOCUMENTS

| 5,577,146 A | * | 11/1996 | Musk | 385/92 |
| 6,126,325 A | * | 10/2000 | Yamane et al. | 385/92 |
| 6,572,275 B1 | * | 6/2003 | Shimoji et al. | 385/76 |
| 6,634,796 B1 | * | 10/2003 | de Jong et al. | 385/56 |
| 6,682,228 B1 | * | 1/2004 | Rathnam et al. | 385/55 |
| 2004/0264877 A1 | * | 12/2004 | Makhlin et al. | 385/78 |

* cited by examiner

*Primary Examiner*—Chandrika Prasad

(57) ABSTRACT

According to an aspect of the invention, an optical fiber receptacle adaptor is provided. The optical fiber receptacle adaptor has a receptacle end and a port end. The receptacle end is secureable to an optical fiber receptacle and is adapted to receive a free end of the optical fiber receptacle. The port end is adapted to receive an optical ferrule, and for urging the optical ferrule into communication with the free end of the optical fiber receptacle.

16 Claims, 7 Drawing Sheets

OPTICAL FIBER RECEPTACLE ADAPTOR

BACKGROUND

This invention relates to an optical fiber receptacle adaptor, and in particular to an optical fiber coupling system that includes the optical fiber receptacle adaptor.

An optical fiber transceiver generally comprises a Transmitter Optical Sub-Assembly (TOSA) and a Receiver Optical Sub-Assembly (ROSA). Both of these optical sub-assemblies are aligned with respective openings or ports in a common housing of the optical fiber transceiver, and mounted therein. Each optical sub-assembly includes an optical fiber receptacle and an opto-electronic portion, with one end of the optical fiber receptacle being attached to an optical port on the opto-electronic portion. The other free-end of the optical fiber receptacle has an opening for receiving an optical ferrule, which includes an optical fiber.

An optical fiber plug can be connected to either of the optical sub-assemblies in the transceiver by inserting the optical fiber plug, into the respective port in the housing of the optical fiber transceiver. When the optical fiber plug is inserted into a port, the optical ferrule in the optical fiber plug is received into the opening of the optical fiber receptacle, to be aligned therein. The optical fiber plug may be, for example an optical fiber plug in accordance with a Type SC Standard or a Type LC Standard connector; and the ports in the housing of the transceiver are dimensioned in accordance with a corresponding Type SC or Type LC port.

The optical fiber receptacle on an optical sub-assembly, is typically not concentrically aligned with the port in the housing of the transceiver. Such misalignment is often due to displacement of the optical fiber receptacle relative to the opto-electronic portion of the optical sub-assembly. Displacement tends to occur when the optical fiber receptacle is optically aligned and attached to the opto-electronic portion, because optical alignment between the optical fiber receptacle and the opto-electronic portion does not typically coincide with mechanical alignment between the optical fiber receptacle and the opto-electronic portion. Consequently, when the optical sub-assembly is mounted in the housing of the optical transceiver, the optical fiber receptacle is not concentrically aligned with the port in the housing.

Another cause of misalignment is the tolerance of the thickness of the opto-electronic portion of the optical sub-assembly, and the amount of compression of thermal sheets that may be applied to the opto-electronic portion prior to mounting within the optical transceiver housing. To compensate for the misalignment and allow the optical ferrule in the optical fiber plug to enter the opening in the optical fiber receptacle, the port on the transceiver housing is generally made larger than the cross-sectional area tolerances of the optical fiber plug. Consequently, the inserted optical fiber plug is not properly supported within the enlarged port, and the optical fiber plug moves or wriggles about. This movement or wriggling of the optical fiber plug results in less than optimal alignment of the optical ferrule within the optical fiber receptacle. Consequently, such wriggling introduces relatively large insertion loss (also termed wriggles insertion loss). The large insertion loss also causes non-repeatable mating performance between the optical fiber plug and a port on the optical fiber transceiver.

In order for the optical fiber receptacle of an optical sub-assembly to be at least substantially concentric to the port on the transceiver housing, a complex assembly process is required to align and mount the optical sub-assembly within the transceiver housing. The complex assembly process results in lower throughput and lower production yields of optical fiber transceivers.

Hence, there is a need for optical sub-assemblies to be mounted in an optical transceiver, which reduces wriggles insertion loss, and which requires a relatively simple assembly process.

SUMMARY

According to an aspect of the invention, an optical fiber receptacle adaptor is provided. The optical fiber receptacle adaptor has a receptacle end and a port end. The receptacle end is secureable to an optical fiber receptacle and is adapted to receive a free end of the optical fiber receptacle. The port end is adapted to receive an optical ferrule, and for urging the optical ferrule into communication with the free end of the optical fiber receptacle.

According to another aspect of the invention, there is provided an optical fiber coupling system including an optical fiber receptacle having a free end and an optical fiber receptacle adaptor as described above.

According to another further aspect of the invention, there is provided a method for assembling the optical fiber coupling system. The method includes inserting an optical fiber receptacle into a receptacle opening at a receptacle end of an optical fiber receptacle adaptor, and securing the optical fiber receptacle to the receptacle end, thereby assembling the optical fiber coupling system.

BRIEF DESCRIPTION OF DRAWINGS

The invention will be better understood with reference to the drawings, in which.

DETAILED DESCRIPTION

The optical fiber coupling system according to an embodiment of the invention includes an optical transmitter or receiver sub-assembly and an optical fiber receptacle adaptor. The optical fiber coupling system refers to an assembly which includes either an optical transmitter sub-assembly or an optical receiver sub-assembly, and the receptacle adaptor.

Figure 1:
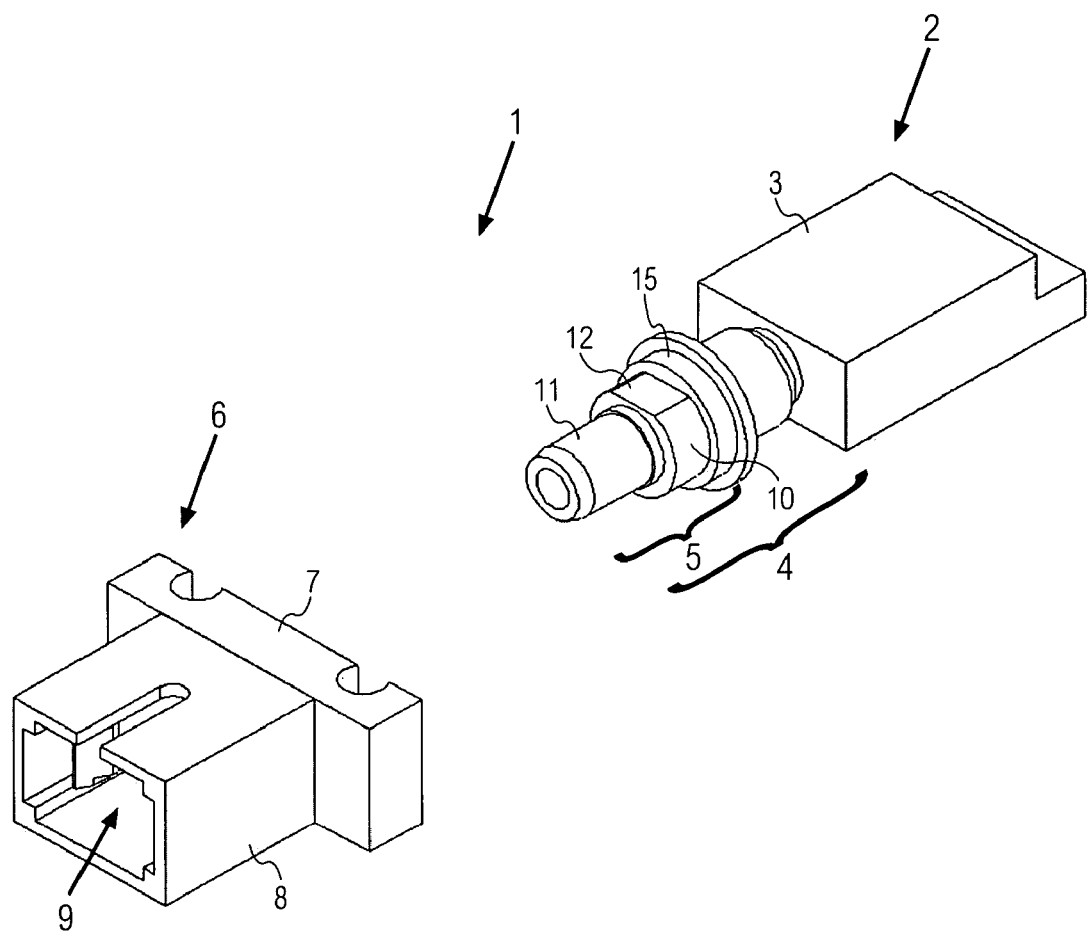
FIG. 1 is an isometric drawing of an optical sub-assembly and an optical fiber receptacle adaptor of an optical fiber coupling system, according to an embodiment of the invention.

With reference to FIG. 1, an exploded view of the optical fiber coupling system 1 according to an embodiment of the invention is shown. The optical fiber coupling system 1 includes an optical sub-assembly 2 and an optical fiber receptacle adaptor 6. The optical sub-assembly 2 includes an opto-electronic portion 3 and an optical fiber receptacle 4. The optical fiber receptacle 4 includes an optical ferrule receiving portion 5 for receiving an optical ferrule (not shown), for example from an optical fiber plug (not shown) on an optical fiber patchcord (not shown). The optical ferrule receiving portion 5 may also be referred as the free end of the optical fiber receptacle 4. When the opto-electronic portion 3 is a transmitter opto-electronic portion, the opto-electronic portion 3 generates an optical signal which is output through the optical fiber receptacle 4 to the optical ferrule (not shown), which would be located in the optical ferrule receiving portion 5 of the optical fiber receptacle 4.

The optical fiber receptacle adaptor 6 includes a receptacle end 7 having a receptacle opening (not shown) that receives the optical ferrule receiving portion 5 or free end of the optical fiber receptacle 4, when the optical sub-assembly 2 is assembled with the optical fiber receptacle adaptor 6. The receptacle adaptor 6 further includes a port end 8 opposite to the receptacle end 7. The port end 8 has an optical fiber port 9 which is an opening for receiving the plug of the optical fiber patchcord. When the plug of the optical fiber patchcord is received within the optical fiber port 9, the optical ferrule from the plug is received into the optical ferrule receiving portion 5 of the optical fiber receptacle 4.

The optical fiber receptacle 4 of the optical sub-assembly 2 normally comprises an optical ferrule (not shown) housed within the optical ferrule receiving portion 5. When the plug of the optical fiber patchcord is received into the optical fiber port 9, the optical ferrule of the plug is aligned in the optical ferrule receiving portion 5 with the optical ferrule (not shown) of the optical sub-assembly 2.

Each optical ferrule has a bore defined therein for receiving an end portion of an optical fiber. By aligning the ferrules of the optical fiber patchcord and the optical sub-assembly 2, the optical signal generated by the opto-electronic portion 3 can be transmitted from the optical fiber of the optical sub-assembly 2 to the optical fiber in the patchcord with low signal loss. The optical fiber plug is compliant to, but not limited to, a Type SC Standard and a Type LC Standard connector (referred as "SC connector" and "LC connector" respectively). Accordingly, the optical fiber port 9 of the receptacle adaptor 6 for receiving the optical fiber plug includes, but not limited to, a Type SC and a Type LC port, respectively.

The optical ferrule receiving portion 5 includes a ring 10 which surrounds a tubular section 11 of the optical ferrule receiving portion 5. The ring 10 of the optical ferrule receiving portion 5 has a flat cut-off portion 12. The shape of the receptacle opening (not shown) at the receptacle end 7 is complementary to the shape of the ring 10 having the flat portion 12 and a further ring 15 adjacent the flattened ring 10, so that the optical ferrule receiving portion 5 when received into the receptacle opening at the receptacle end 7 is fixed in position relative to the receptacle adaptor 6. In particular, the optical ferrule receiving portion 5 can only be received in a fixed position and direction into the receptacle opening such that the optical ferrule receiving portion 5 is aligned at least substantially in a centre position of the receptacle adaptor 6.

In an embodiment where the optical fiber port 9 of the receptor adaptor 6 is a Type SC port, an optical fiber patchcord having a SC connector can be inserted therein. Since the optical ferrule receiving portion 5 of the optical sub-assembly 2 is at the centre position of the receptacle adaptor 6, the optical ferrule of the SC connector is aligned with the optical ferrule in the optical ferrule receiving portion 5 of the optical sub-assembly 2. In this manner, the movement of the plug within the receptacle adaptor 6 is restricted. In other words, the port end urges the optical ferrule (of the SC connector) into communication with the optical receiving portion 5. The transmission of an optical signal between the ferrules of both the plug and the optical ferrule receiving portion 5 is less prone to insertion loss caused by wriggles since the ferrules are held more firmly in place than the current state of the art. This advantageous feature also results in robust repeatable mating of the optical fiber plug (not shown) and the optical fiber port 9.

The receptacle adaptor 6 may be secured to the optical sub-assembly 2 using adhesive in one embodiment. More specifically, a layer of adhesive may be applied on the surface of the ring 10 of the optical ferrule receiving portion 5. In this way, the receptacle adaptor 6 is glued to the optical ferrule receiving portion 5 when the optical fiber receptacle 4 is extended into receptacle adaptor 6, thereby securing the receptacle adaptor 6 to the optical sub-assembly 2.

Figure 2:
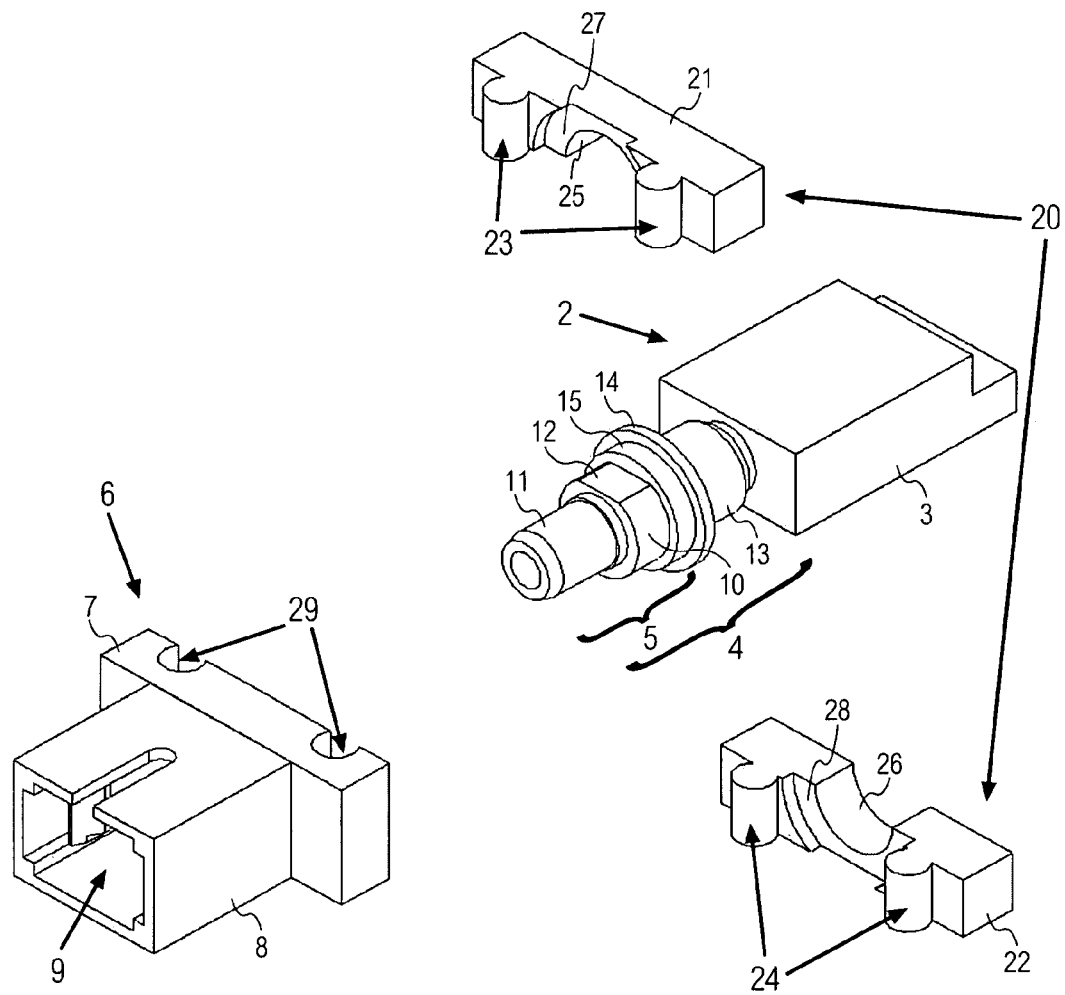
FIG. 2 is an exploded isometric drawing of the optical fiber coupling system in FIG. 1, and a locking module for securing the optical fiber receptacle adaptor to the optical sub-assembly.
Figure 3:
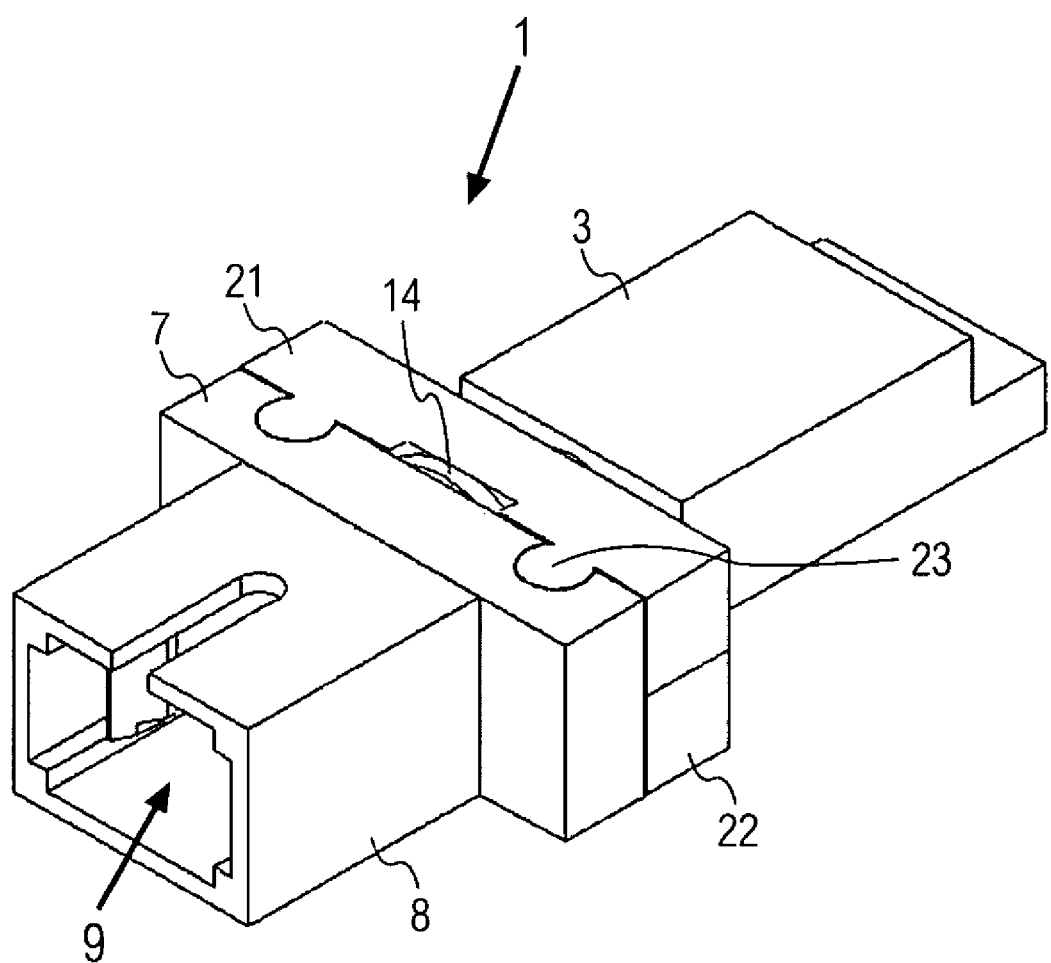
FIG. 3 is an isometric drawing of the optical fiber coupling system in FIG. 2, wherein the optical fiber receptacle adaptor is shown engaged to the locking module and secured to the optical sub-assembly.
Figure 4:
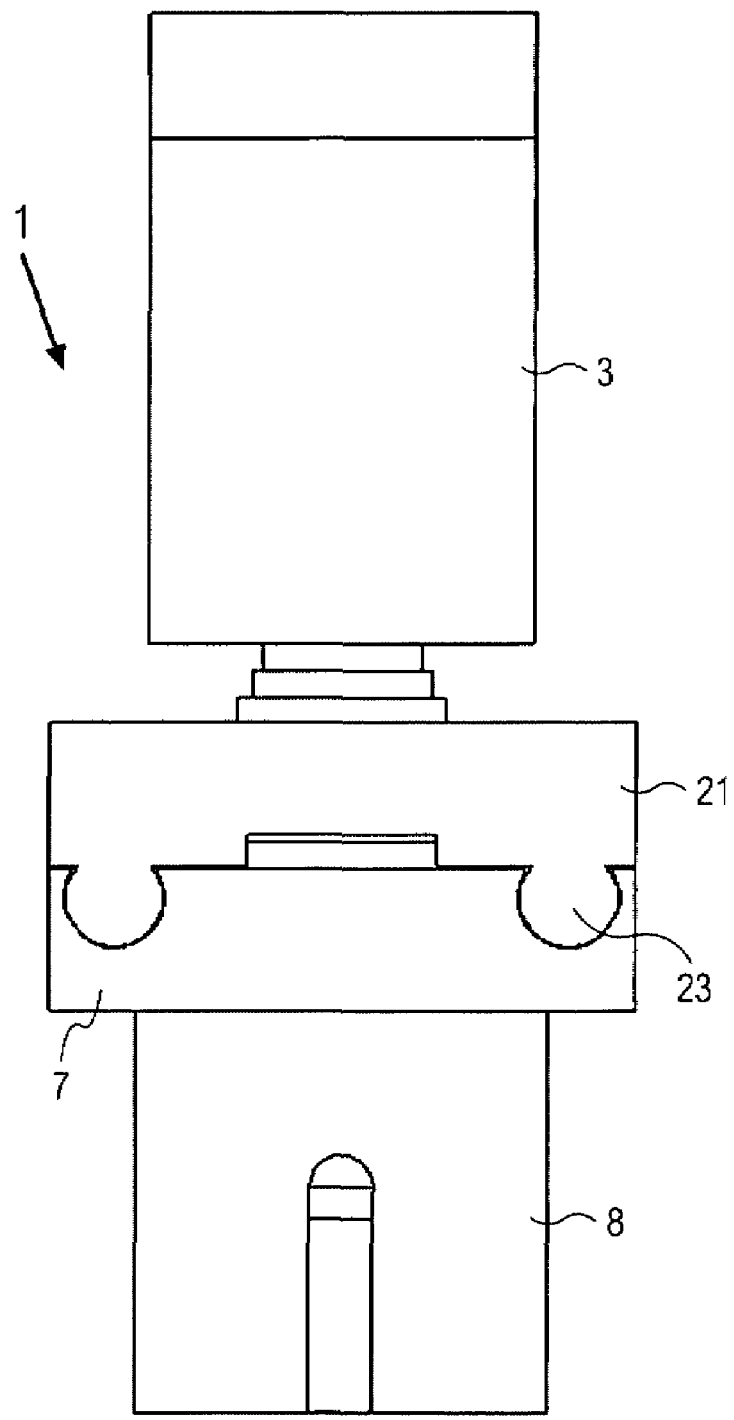
FIG. 4 is a top view of the optical fiber coupling system in FIG. 3.

The receptacle adaptor 6 may also be secured to the optical sub-assembly using a locking module 20 as shown in FIGS. 2–4. The embodiment of the locking module 20 as shown in FIG. 2 includes a first locking portion 21 and a second locking portion 22. The first locking portion 21 has two cylindrical protrusions 23, and similarly, the second locking portion 22 has two cylindrical protrusions 24. The receptacle end 7 of the receptacle adaptor 6 has two corresponding cylindrical undercut slots 29. Each undercut slot 29 of the receptacle adaptor 6 receives one protrusion 23, 24 from each of the first locking portion 21 and the second locking portion 22. The undercut slot 29 and each protrusion 23, 24 of the first locking portion 21 and the second locking portion 22 form a formfitting locking mechanism. In other words, the protrusions 23, 24 of the first and second locking portions 21, 22 fit snugly in the undercut slots 29 so that the protrusions 23, 24 are firmly locked therein. The first locking portion 21 and the second locking portion 22 are thus said to be engaged with the receptacle adaptor 6 as shown in FIGS. 3 and 4.

The undercut slots 29 of the receptacle adaptor 6 and the protrusions 23, 24 of the first and second locking portions 21, 22 may be of other shapes instead of the cylindrical shape, as long as the first and second locking portions 21, 22 and hence the locking module 20, are engageable to the receptacle adaptor 6. Furthermore, each locking portion 21, 22 of the locking module 20 may include only one locking portion 23, 24 engageable to the receptacle adaptor 6 for securing the receptacle adaptor 6 to the optical sub-assembly 2.

Figure 5:
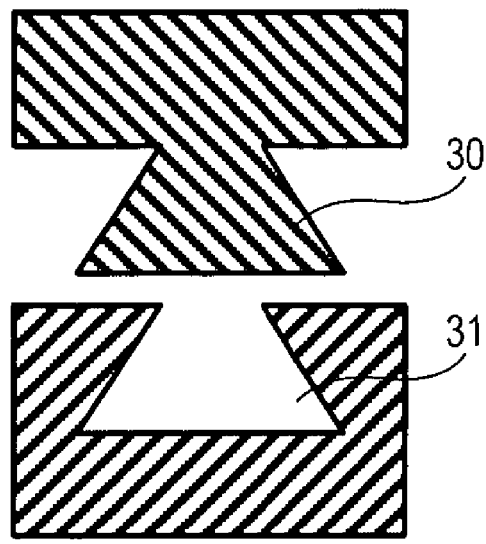
FIG. 5 is a drawing of a formfitting locking mechanism by which the locking module engages the optical fiber receptacle adaptor.
Figure 6:
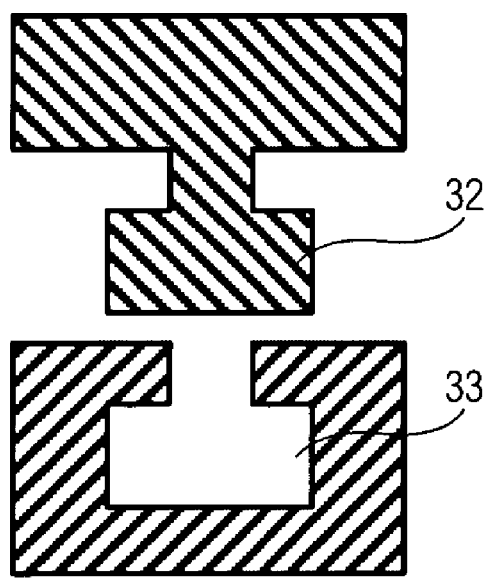
FIG. 6 is a drawing of another formfitting locking mechanism by which the locking module engages the optical fiber receptacle adaptor.

With reference to FIGS. 5 and 6, other examples of the undercut slot of the receptacle adaptor 6 and corresponding protrusion of the locking module 20 are shown. In FIG. 5, an example of a trapezoidal protrusion 30 and a corresponding trapezoidal undercut slot 31 is shown. The trapezoidal protrusion 30 is engageable to the trapezoidal undercut slot 31 by forming a formfitting locking mechanism with the trapezoidal undercut slot 31. Similarly, an example of an inverted-T protrusion 32 and a corresponding inverted-T undercut slot 33 is shown in FIG. 6. The inverted-T protrusion 32 is engageable to the inverted-T undercut slot 33 by forming a formfitting locking mechanism with the inverted-T undercut slot 33.

In the embodiment shown in FIG. 2, the first locking portion 21 and the second locking portion 22 each includes an arch portion 25, 26. When the first and second locking portions 21,22 are engaged to the receptacle adaptor 6, the arch portions 25,26 abut each other to define a through-hole between the first and second locking portions 21,22. The first locking portion 21 has a recessed surface 27 and the second locking portion 22 also has a matching recessed surface 28. When the first and second locking portions 21,22 are engaged to the receptacle adaptor 6, the two recessed surfaces 27,28 form a single combined recessed surface surrounding an opening of the through-hole.

The optical fiber receptacle 4 of the optical sub-assembly 2 has a collar portion 13 and a flange portion 14. The collar portion 13 is disposed between the opto-electronic portion 3 and the flange portion 14. The flange portion 14 is between the collar portion 13 and the optical ferrule receiving portion 5.

When the first and second locking portions 21,22 are engaged to the receptacle adaptor 6, the collar portion 13 extends through the through-hole of the locking module 20. In addition, the flange portion 14 abuts the single combined recessed surface surrounding the opening of the through-hole formed by the first and second locking portions 21,22. The position of the optical ferrule receiving portion 5 may not be concentric with the flange portion 14 and the collar portion 13. The non-concentric position of the optical ferrule receiving portion 5 with the flange portion 14 may occur when optically aligning the optical fiber receptacle 4 with the opto-electronic portion 3, as the optical alignment between them does not typically coincide with their mechanical alignment. Since the position of the optical ferrule receiving portion 5 and the locking module 20 is fixed relative to the receptacle adaptor 6, the diameter of the through-hole is larger than the diameter of the collar portion 13, and the area of the single combined recessed surface is larger than the area of the flange portion 14. This allows the flange portion 14 and the collar portion 13 to be off-centered with respect to the optical ferrule receiving portion 5. However, the diameter of the through-hole is smaller than the diameter of the flange portion 14 so that the combined recessed surface surrounding the opening of the through-hole formed by the first and second locking portions 21,22 abuts the flange portion 14 to urge and thus secure the optical sub-assembly 2 to the receptacle adaptor 6.

The assembled optical fiber coupling system 1 according to the invention is shown in FIG. 3. The plan view of the assembled optical fiber coupling system 1 is shown in FIG. 4.

The locking module 20 described in embodiments shown in FIGS. 2 to 6 uses a formfitting locking mechanism for engaging the locking module 20 to the receptacle adaptor 6, thereby securing the receptacle adaptor 6 to the optical sub-assembly 2. However the invention is not limited to using a formfitting locking mechanism for engaging the locking module 20 to the receptacle adaptor 6. Other forms of locking mechanisms are possible, including but not limited to a snap mechanism and a clip mechanism.

Figure 7:
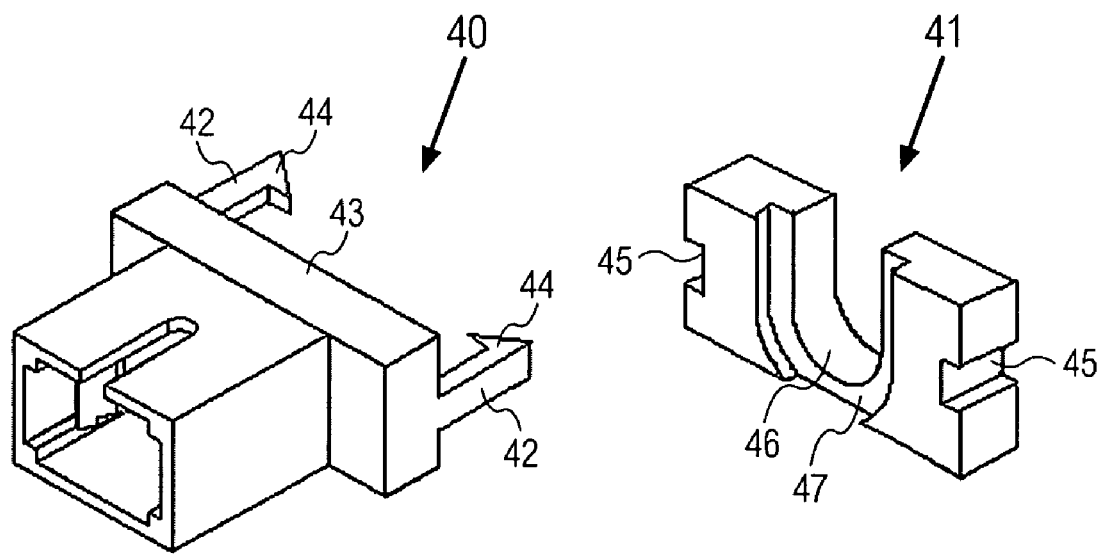
FIG. 7 is an isometric drawing of an optical fiber receptacle adaptor and a locking module according to another embodiment of the invention, the optical fiber receptacle adaptor is engageable with the locking module using a snap mechanism.

With reference to FIG. 7, an optical fiber receptacle adaptor 40 which is engageable with a locking module 41 using a snap mechanism is shown. The receptacle adaptor 40 according to this embodiment of the invention has two resilient arms 42 extending out from two ends of the receptacle end 43 of the receptacle adaptor 40. Each free end of the arm 42 includes a snap-hook 44. The locking module 41 includes two corresponding slots 45 at the two sides of the locking module 41 for accommodating the respective two arms 42 of the receptacle adaptor 40. The locking module 41 further includes an arch portion 46 and a recessed surface 47. The recessed surface 47 faces the receptacle end 43 of the receptacle adaptor 40 when the locking module 41 is engaged with the receptacle adaptor 40.

To engage the locking module 41 to the receptacle adaptor 40, the arms 42 are guided along each corresponding slots 45 of the locking module 41. The locking module 41 is pushed towards the receptacle adaptor 40 until it is snap-locked to the receptacle adaptor 40 by the snap-hooks 44 of the arms 42. When engaged to the receptacle adaptor 40, the collar portion 13 of the optical fiber receptacle 4 extends through the arch portion 46 of the locking module 41. The flange portion 14 of the optical fiber receptacle 4 abuts the recessed surface 47 of the locking module 41.

Figure 8:
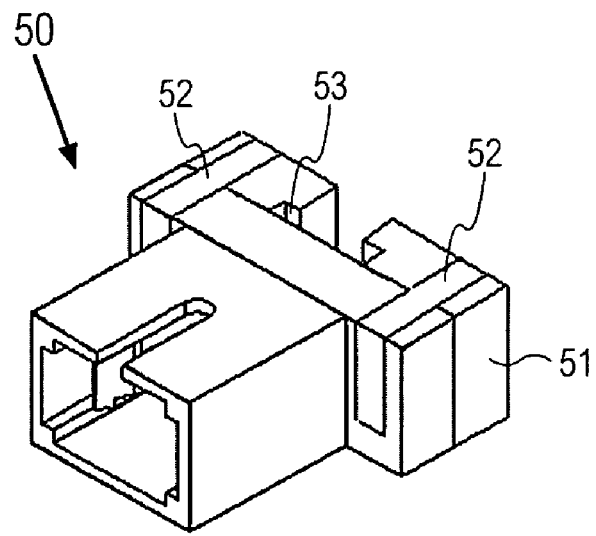
FIG. 8 is an isometric drawing of an optical fiber receptacle adaptor and a locking module according to another embodiment of the invention, the optical fiber receptacle adaptor is engageable with the locking module using a pair of clips.

With reference to FIG. 8, an optical fiber receptacle adaptor 50 which is engageable with a locking module 51 using a pair of clips 52 is shown. In this embodiment, the locking module 51 is engaged to the receptacle adaptor 50 using the pair of clips 52 that clamps the two portions to each other. The locking module 51 in this embodiment also comprises an arch portion (not shown) and a recessed surface 53 similar to those of the locking module 41 in FIG. 7. When engaged to the receptacle adaptor 50, the collar portion 13 of the optical fiber receptacle 4 extends through the arch portion of the locking module 51, and the flange portion 14 of the optical fiber receptacle 4 abuts the recessed surface 53 of the locking module 51.

Although only a single-portioned locking module is used in the embodiments as shown in FIGS. 7 and 8, two or more locking portions may be used as the locking module, for example, in the embodiment shown in FIG. 2.

As mentioned above, the optical fiber coupling system 1 is able to receive the plug of an optical fiber patchcord to connect it to the optical sub-assembly 2 with low insertion loss and robust repeatable mating. It is therefore advantageous to use the optical fiber coupling system 1 according to the invention in an opto-electronic module, in particular an optical transceiver module wherein optical fiber patchcords can be received and connected thereto.

Figure 9:
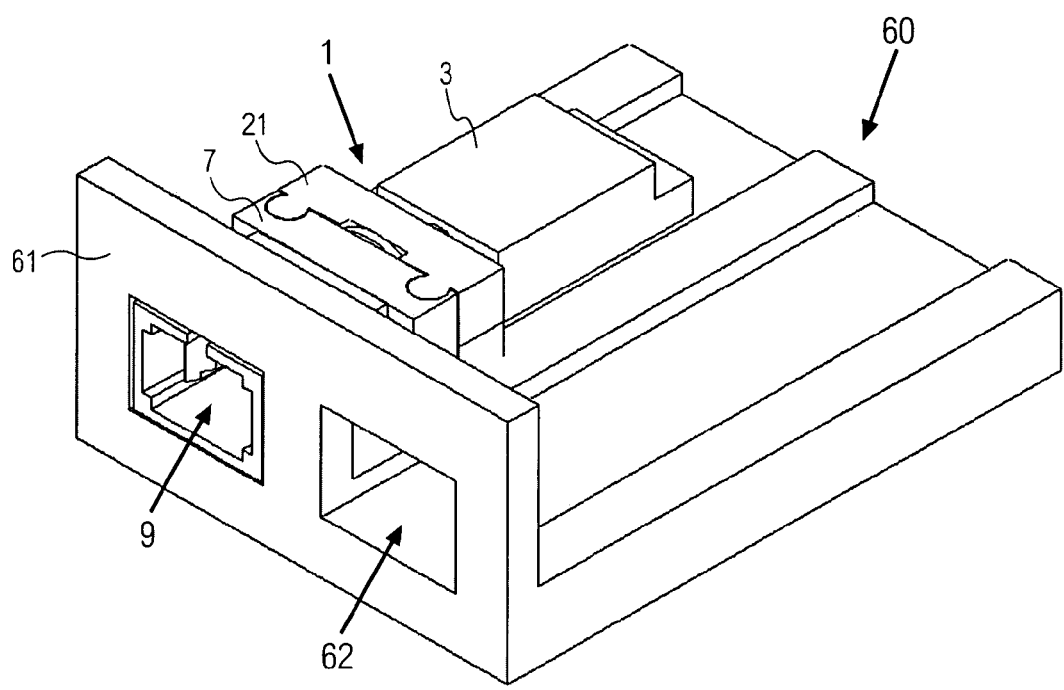
FIG. 9 is an isometric drawing of the optical fiber coupling system of FIG. 3 shown mounted within a housing to form an opto-electronic module.

Therefore, according to another aspect of the invention, an opto-electronic module comprising a module housing and the optical fiber coupling system 1 is provided. The optical fiber coupling system 1 is mounted within the module housing 60 as shown in FIG. 9. The optical fiber coupling system 1 includes the optical sub-assembly 2 and the optical fiber receptacle adaptor 6 as already described in the earlier aspect of the invention.

The module housing 60 comprises a housing panel 61 having two openings 62. The optical fiber coupling system 1 is arranged within the module housing 60 with the optical fiber port 9 of the receptacle adaptor 6 facing one of the openings 62 of the panel 61. With this arrangement, the plug of an optical fiber patchcord can be inserted into the optical fiber port 9 of the receptacle adaptor 6 through the opening 62 of the housing panel 61.

The optical fiber coupling system 1 can be mounted into the module housing 60 by screwing the optical fiber coupling system 1 thereon. The optical fiber coupling system 1 may even be mounted into the module housing 60 using a clip or snap mechanism. It is also possible to simply glue the optical fiber coupling system 1 to the housing module 60 using adhesive.

According to an embodiment of the invention, another optical fiber coupling system (not shown) may also be mounted alongside the optical fiber coupling system 1 within the module housing 60. For example, in an optical transceiver module, one of the optical fiber coupling system may include an optical transmitter sub-assembly and a receptacle adaptor, and the other optical fiber coupling system may include an optical receiver sub-assembly and a receptacle adaptor. Therefore, the optical transceiver module having connection ports with low insertion loss and robust repeatable mating is thus formed according to this embodiment of the invention.

Advantageously, the invention provides a simple assembly process for assembling the opto-electronic module, compared to the current state of the art. Previously, the optical ferrule receiving portion 5 in the opto-electronic module needs to be aligned with the opening 62 in the module housing 60, so that the opening of the optical ferrule receiving portion 5 is concentric to the opening 62 of the module housing 60. This precise alignment of the optical ferrule receiving portion 5 results in a very complicated assembly process and hence high yield loss during the manufacturing of the opto-electronic module.

The optical fiber coupling system 1 according to the invention is able to align the optical ferrule receiving portion 5 of the optical sub-assembly 2 with the receptacle adaptor 6 automatically, so that the opening of the optical fiber receiving portion 5 is always at the centre of the optical fiber port 9 of the receptacle adaptor 6 (i.e. concentric to the optical fiber port 9). Therefore, the complicated assembly process for aligning the optical ferrule receiving portion 5 to the module housing opening 62 is eliminated, resulting in cost reduction and higher yield compared to the current state of the art.

The optical fiber coupling system 1 can simply be mounted within the module housing 60 so that the plug of an optical fiber patchcord can be inserted through the opening 62 of the module housing 60 into the receptacle adaptor 6.

I claim:

1. An optical fiber receptacle adaptor comprising:
  a single-part housing comprising a receptacle end having an opening and a plug receiving end,
  the receptacle end adapted for securing to an optical fiber receptacle and for inserting therein and receiving an optical ferrule receiving portion of the optical fiber receptacle, and
  the plug receiving end adapted for inserting therein and receiving an optical ferrule and for urging the optical ferrule into communication with the optical ferrule receiving portion of the optical fiber receptacle; and
  a locking module for securing the single-part housing to the optical fiber receptacle, wherein the locking module comprises a top surface including a protrusion opening for accommodating a vertical protrusion of the optical fiber receptacle.

2. An optical fiber receptacle adaptor according to claim 1, wherein the locking module comprises a first locking portion and a second locking portion, the first locking portion and the second locking portion are each engageable with the optical fiber receptacle adaptor, and define, when engaged with the optical fiber receptacle adaptor, a through-hole between the first locking portion and the second locking portion for engaging the optical fiber receptacle.

3. An optical fiber receptacle adaptor according to claim 2, wherein the first locking portion and the second locking portion are lockable to the optical fiber receptacle adaptor by a formfitting locking mechanism.

4. An optical fiber receptacle adaptor according to claim 3, wherein the receptacle end comprises at least one undercut slot and each of the first locking portion and the second locking portion comprises at least one protrusion having a surface complementary to the undercut slot, wherein the undercut slot of the optical fiber receptacle adaptor receives the protrusion of the at least one of the first locking portion and the second locking portion and is locked therewith.

5. An optical fiber receptacle adaptor according to claim 4, wherein the undercut slot of the optical fiber receptacle adaptor receives the protrusion of both the first locking portion and the second locking portion and is locked therewith.

6. An optical fiber receptacle adaptor according to claim 4, wherein the undercut slot of the optical fiber receptacle adaptor and the respective protrusions of the first locking portion and the second locking portion are substantially cylindrically shaped.

7. An optical fiber coupling system comprising:
  an optical fiber receptacle having an optical ferrule receiving portion, and
  an optical fiber receptacle adaptor having
    a single-part housing comprising a receptacle end having an opening and a plug receiving end, the receptacle end adapted for securing to the optical fiber receptacle and for inserting therein and receiving the optical ferrule receiving portion of the optical fiber receptacle, and the plug receiving end adapted for inserting therein and receiving an optical ferrule and for urging the optical ferrule into communication with the optical ferrule receiving portion of the optical fiber receptacle, and
  a locking module for securing the single-part housing to the optical fiber receptacle, wherein the locking module comprises a top surface including a protrusion opening for accommodating a vertical protrusion of the optical fiber receptacle.

8. An optical fiber coupling system according to claim 7, wherein the locking module comprises a first locking portion and a second locking portion, the first locking portion and the second locking portion are each engageable with the optical fiber receptacle adaptor, and define, when engaged with the receptacle adaptor, a through-hole between the first locking portion and the second locking portion for engaging the optical fiber receptacle.

9. An optical fiber coupling system according to claim 8, wherein the first locking portion and the second locking portion are lockable to the optical fiber receptacle adaptor by a formfitting locking mechanism.

10. An optical fiber receptacle adaptor according to claim 9, wherein the receptacle end comprises at least one undercut slot and each of the first locking portion and the second locking portion comprises at least one protrusion having a surface complementary to the undercut slot, wherein the undercut slot of the optical fiber receptacle adaptor receives the protrusion of the at least one of the first locking portion and the second locking portion and is locked therewith.

11. An optical fiber coupling system according to claim 10, wherein the undercut slot of the optical fiber receptacle adaptor receives the protrusion of both the first locking portion and the second locking portion and is locked therewith.

12. An optical fiber coupling system according to claim 10, wherein the undercut slot of the optical fiber receptacle adaptor and the respective protrusions of the first locking portion and the second locking portion are substantially cylindrically shaped.

13. An optical fiber coupling system according to claim 8, wherein the optical fiber receptacle comprises a collar portion extending from a flange portion thereof, the collar portion extending through the through-hole defined between the first locking portion and the second locking portion of the locking module when the locking module is engaged with the optical fiber receptacle adaptor, thereby securing the optical fiber receptacle adaptor to the optical fiber receptacle.

14. An optical fiber coupling system according to claim 13, wherein respective matching surfaces of the first locking portion and the second locking portion surrounding the through-hole, when the first locking portion and the second locking portion are engaged with the optical fiber receptacle adaptor, are recessed, the recessed surfaces accommodating the flange portion of the optical fiber receptacle when the locking module is engaged with the optical fiber receptacle adaptor.

15. An optical fiber coupling system according to claim 8, wherein first locking portion and the second locking portion are lockable to the optical fiber receptacle adaptor by one of a snap and a clip mechanism.

16. A method for assembling an optical fiber coupling system, the method comprising:

inserting an optical fiber receptacle into a receptacle opening at a receptacle end of an optical fiber receptacle adaptor having a single-part housing comprising a plug receiving end and the receptacle end having the receptacle opening; and securing the optical fiber receptacle to the receptacle end by attaching a locking module to the receptacle end, wherein the locking module comprises a top surface including a protrusion opening for accommodating a vertical protrusion of the optical fiber receptacle, thereby assembling the optical fiber coupling system.

* * * * *